Figure 1:
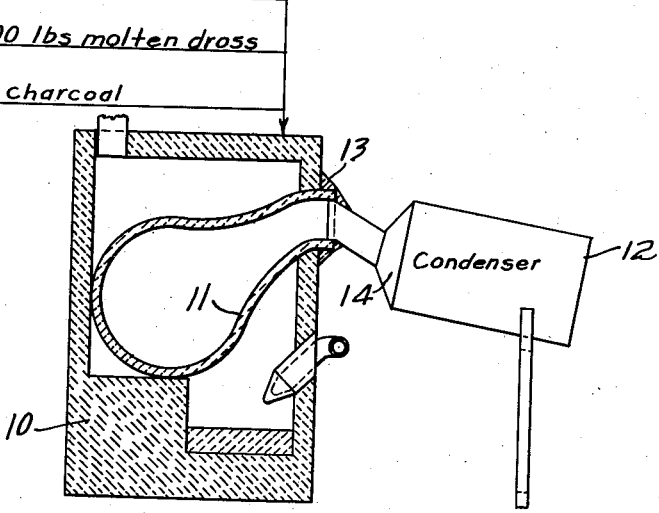

Sept. 24, 1940.   E. A. HAWK   2,215,961
METHOD OF RECOVERY OF ZINC FROM DROSS
Filed Jan. 20, 1940

200 to 300 lbs cool solid dross
3500 to 4000 lbs molten dross
5 to 10 lbs charcoal INVENTOR
EDGAR A. HAWK
BY
Johnston & Jennings
ATTORNEYS Patented Sept. 24, 1940

2,215,961

UNITED STATES PATENT OFFICE 2,215,961

METHOD OF RECOVERY OF ZINC FROM DROSS

Edgar A. Hawk, Birmingham, Ala., assignor to W. J. Bullock, Inc., a corporation of Delaware Application January 20, 1940, Serial No. 314,740

2 Claims. (Cl. 75—88)

This invention relates to a process for recovering zinc from the dross resulting from a galvanizing process, and has for its objects the reduction of the time and labor required to distill the zinc from a batch of dross; to reduce the labor heretofore required in charging a retort and bringing the retort up to distilling temperature; and to increase the amount of zinc recoverable from dross within a given unit of time.

A more specific object of my invention is to provide an improved method for charging the retort of a retort type furnace for distilling zinc from dross, whereby the dross may be charged into the retort in a molten condition, and the time of charging and distillation thus greatly reduced.

As is well known, in the galvanizing of sheet iron by dipping the sheets into molten zinc, the zinc in the galvanizing kettle gradually acquires an increasing percentage of iron. As the percentage of iron increases, the zinc becomes pasty or less fluid, and unsuitable for the galvanizing process. This pasty substance is periodically removed from the bottom of the kettle, and the zinc is recovered therefrom by distillation. Being difficult to get into a liquid or molten condition, it has heretofore been the practice to charge the retort of the furnace with chunks of the solid dross and, by stirring and feeding, finally completely charge the retort. With a furnace having a capacity of around 3700 pounds of metal, it has heretofore required around three hours before the charge could be completed and brought to vaporizing temperature. Furthermore, where attempts have been made to charge such a retort with the molten dross, differences in temperature which may exist between the heated retort and the dross have been such as to cause miniature explosions and blowing out of the molten dross from the mouth of the retort and endangering the furnace operators.

I have discovered that the dross may be readily gotten into a molten condition by heating and stirring in an open crucible type melting pot or furnace, and with periodical stirring to maintain the iron content in suspension in the zinc and thus prevent its sinking to the bottom of the pot and producing a paste in the melting pot. I have also found that blowouts from the heated retort can be prevented by first introducing into the retort sufficient cold solid dross, usually equivalent to from 4% to 10% of the total amount to be charged. With a furnace taking a total charge of from 3500 to 4000 pounds, I first introduce into the heated retort from 200 to 300 pounds of cool dross in a solid form, the retort being heated to the distillation temperature of the zinc, or around 2640° F. With the retort thus prepared, the entire remainder of the charge may be poured into the retort in a molten condition from the melting pot, the cool solid dross momentarily reducing the temperature sufficiently to prevent any blowouts. I also add a small amount, say from 5 to 10 pounds, of carbonaceous material, such as charcoal, to reduce the oxygen in the retort.

Figure 2:
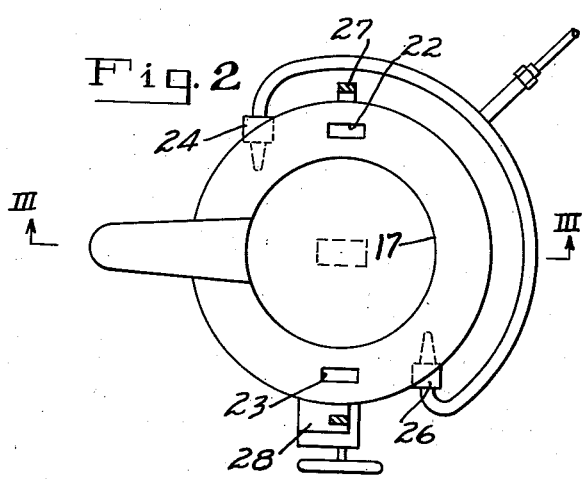
Figure 3:
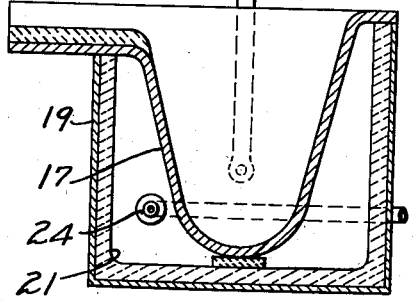

In the accompanying drawing, Fig. 1 is a diagrammatic view of a retort furnace with condenser attached, and illustrating the steps of charging the furnace;

Fig. 2 is a plan view of a crucible type furnace or melting pot suitable for melting the major portion of the charge of dross; and Fig. 3 is a cross sectional view taken along the line III—III of Fig. 2.

Referring to the drawing, in Fig. 1 I show a retort type furnace 10 embodying a retort 11. Attached to the furnace 10 and connected to the mouth of the retort 11 is a condenser 12, of a form well understood in the art. Suitable luting 13 and 14 is placed around the mouth of the retort 11 and the condenser 12 to prevent leakage when the distillation process is being carried out. This equipment is standard in the art, and requires no further detail description.

In carrying out my process, I first bring the retort 11 to a temperature in the neighborhood of the distillation temperature of zinc, or around 2640° F. As shown in Fig. 1, I then charge the furnace with from 200 to 300 pounds of cool solid dross. I then pour into the mouth of the furnace about 4000 pounds of molten dross prepared as hereinafter described, in order to make a total charge of around 3700 pounds, and add from 5 to 10 pounds of charcoal. It is understood, of course, that the charging operation takes place through the mouth of the retort 11 before the condenser 12 is connected. When the charging has been completed, the condenser is connected, as shown in Fig. 1, and the distillation soon commences. From 22 to 24 hours is required to complete the distillation of a single batch of 4330 pounds.

Referring to Figs. 2 and 3, I show a crucible type furnace or melting pot suitable for carrying out the melting of the dross, and which comprises a melting pot 17 which may be made of cast iron. Surrounding the pot 17 is a shell 19 having a suitable refractory lining 21 to prevent the loss of heat, and with upper openings 22 and 23 for the escape of gases of combustion. Tangentially disposed gas burners 24 and 26 supply the heat for melting the dross. The furnace is provided with a bail 27 and tilting mechanism 28, such as is well known. In melting the dross, it is charged into the pot 17 and stirred so as to maintain the iron content in suspension and the zinc content in a liquid state. By thus maintaining the molten charge in a liquid state, it may be readily poured into the retort 11 through the mouth.

Before adopting my improved process, it required around three hours to charge the retort 11 with the dross and bring it up to a vaporizing temperature. By melting the dross in the pot 17, as herein described, the retort can be charged in a few minutes, and within one hour thereafter, the condenser 12 is condensing zinc. By following my improved process, with a furnace of the capacity described, I have found that at least 340 pounds more metal can be produced each 22 to 24 hour period, and the operating costs correspondingly reduced.

When the condenser 12 is tapped, the molten zinc is poured into heated molds, as is well understood, and when cooled is ready for reuse.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In a method of recovering zinc from dross by distillation, the steps which comprise heating a retort to the distillation temperature of zinc, separately melting the dross and stirring the same to maintain the iron content thereof in suspension, charging the retort with dross in solid form in an amount equivalent to from 4% to 10% of the total charge of the retort, adding sufficient charcoal to reduce the oxygen in the retort and then charging the retort with the molten dross.

2. In a method of recovering zinc from dross by distillation, the steps which comprise melting a charge of zinc dross in an open pot while stirring to maintain the iron content in suspension, heating a retort to a temperature above the melting temperature of zinc, partially charging the retort with solid dross, and then completing the charge with the molten dross.

EDGAR A. HAWK.